United States Patent
Taguchi

(10) Patent No.: US 11,753,989 B2
(45) Date of Patent: Sep. 12, 2023

(54) TURBOMACHINERY AND METHOD FOR DESIGNING TURBOMACHINERY

(71) Applicant: HONDA MOTOR CO., LTD., Tokyo (JP)

(72) Inventor: Shu Taguchi, Wako (JP)

(73) Assignee: HONDA MOTOR CO., LTD, Tokyo (JP)

(*) Notice: Subject to any disclaimer, the term of this patent is extended or adjusted under 35 U.S.C. 154(b) by 0 days.

(21) Appl. No.: 18/164,073

(22) Filed: Feb. 3, 2023

(65) Prior Publication Data

US 2023/0250753 A1 Aug. 10, 2023

(30) Foreign Application Priority Data

Feb. 7, 2022 (JP) .................................. 2022-016835

(51) Int. Cl.
- *F03B 1/00* (2006.01)
- *F02C 3/08* (2006.01)
- *F01D 9/04* (2006.01)

(52) U.S. Cl.
CPC .............. *F02C 3/08* (2013.01); *F01D 9/041* (2013.01); *F05D 2200/13* (2013.01); *F05D 2200/14* (2013.01); *F05D 2260/96* (2013.01)

(58) Field of Classification Search
CPC ...... F04D 29/324; F04D 29/544; F01D 5/142; F01D 5/16; F01D 5/141
USPC .................................................... 415/208.1
See application file for complete search history.

(56) References Cited

U.S. PATENT DOCUMENTS

| | | | |
|---|---|---|---|
| 9,879,539 B2 * | 1/2018 | Lentz | F01D 5/16 |
| 2012/0099961 A1 * | 4/2012 | Delvaux | F04D 29/666 415/220 |
| 2013/0340521 A1 * | 12/2013 | Clark | F01D 5/26 73/462 |
| 2018/0100399 A1 * | 4/2018 | Peeren | F01D 5/16 |
| 2020/0063755 A1 | 2/2020 | Taguchi | |

FOREIGN PATENT DOCUMENTS

| | | |
|---|---|---|
| JP | 5883610 B2 | 3/2016 |
| JP | 2019-163726 A | 9/2019 |

* cited by examiner

*Primary Examiner* — Long T Tran
*Assistant Examiner* — James J Kim
(74) *Attorney, Agent, or Firm* — Rankin, Hill & Clark LLP

(57) ABSTRACT

A turbomachinery includes a casing, a rotor shaft rotatably attached to the casing, a first blade row fixed to either one of the rotor shaft or the casing, and a second blade row fixed to either one of the rotor shaft or the casing and arranged adjacent to the upstream side or downstream side of the first blade row, wherein the turbomachinery sets the number of first blades and the number of second blades in a manner that the interblade phase angle difference of the second blade row is ±180°.

6 Claims, 6 Drawing Sheets

TURBOMACHINERY AND METHOD FOR DESIGNING TURBOMACHINERY

CROSS-REFERENCE TO RELATED APPLICATIONS

This application is based upon and claims the benefit of priority from Japanese Patent Application No. 2022-016835 filed on Feb. 7, 2022, the contents of which are incorporated herein by reference.

BACKGROUND OF THE INVENTION

Field of the Invention

The present invention relates to turbomachinery including rotary blades and stationary blades arranged adjacent to each other in the axial direction, and a method for designing the turbomachinery.

Description of the Related Art

A turbomachinery is used in various pieces of equipment such as a gas turbine engine, an axial flow compressor, and a centrifugal compressor. A turbomachinery is equipped with rotary blades rotating together with a rotary shaft and stationary blades fixed to a casing. The rotary blades and the stationary blades are arranged adjacent to each other in the axial direction. Since a rotary blade and a stationary blade adjacent to each other are in a relationship in which one applies vibrations to the other, in the case of an improper combination, oscillation of amplitude (blade cascade flutter) occurs, resulting in that the product lifetime extremely shortens.

In order to solve such problems, JP 5883610 B2 discloses a technique that a rotary blade row including a plurality of rotary blades is divided into a plurality of sectors in the circumferential direction, and the number of rotary blades is changed for each sector, thereby suppressing excitation.

SUMMARY OF THE INVENTION

However, according to the technique disclosed in JP 5883610 B2, because the air flow changes at each sector, the air flow does not stabilize. Therefore, when the technique disclosed in JP 5883610 B2 is applied to a turbomachine, the efficiency of the turbomachinery reduces.

An object of the present invention is to solve the above-described problems.

One aspect of the disclosure is a turbomachinery including a casing, a rotor shaft rotatably attached to the casing, a first blade row including a plurality of first blades fixed to either one of the rotor shaft or the casing and attached at constant pitches in the circumferential direction of the central axis line, and a second blade row including a plurality of second blades fixed to either one of the rotor shaft or the casing, arranged adjacent to the first blade row on the upstream side or downstream side of the first blade row, and attached at constant pitches in the circumferential direction of the central axis line, wherein the turbomachinery sets the number of first blades and the number of second blades in a manner so that the interblade phase angle of the second blade row is ±180°.

Another aspect is a method of designing a turbomachinery including a casing, a rotor shaft rotatably attached to the casing, a first blade row including a plurality of first blades fixed to either one of the rotor shaft or the casing, attached at constant pitches in the circumferential direction of the central axis line, and a second blade row including a plurality of second blades fixed to either one of the rotor shaft or the casing, arranged adjacent to the first blade row on the upstream side or downstream side of the first blade row, and attached at constant pitches in the circumferential direction of the central axis line, the method including setting the number of first blades and the number of second blades in a manner so that the interblade phase angle of the second blade row is ±180°.

The turbomachinery according to the above aspect can suppress self-excited vibrations without sacrificing aerodynamic performance. Further, the method of designing the turbomachinery according to the above aspect provides a combination of the number of rotary blades and stationary blades of the turbomachinery that can suppress self-excited vibrations by simple calculation.

The above and other objects features and advantages of the present invention will become more apparent from the following description when taken in conjunction with the accompanying drawings in which a preferred embodiment of the present invention is shown by way of illustrative example.

DETAILED DESCRIPTION OF THE INVENTION

Figure 1:
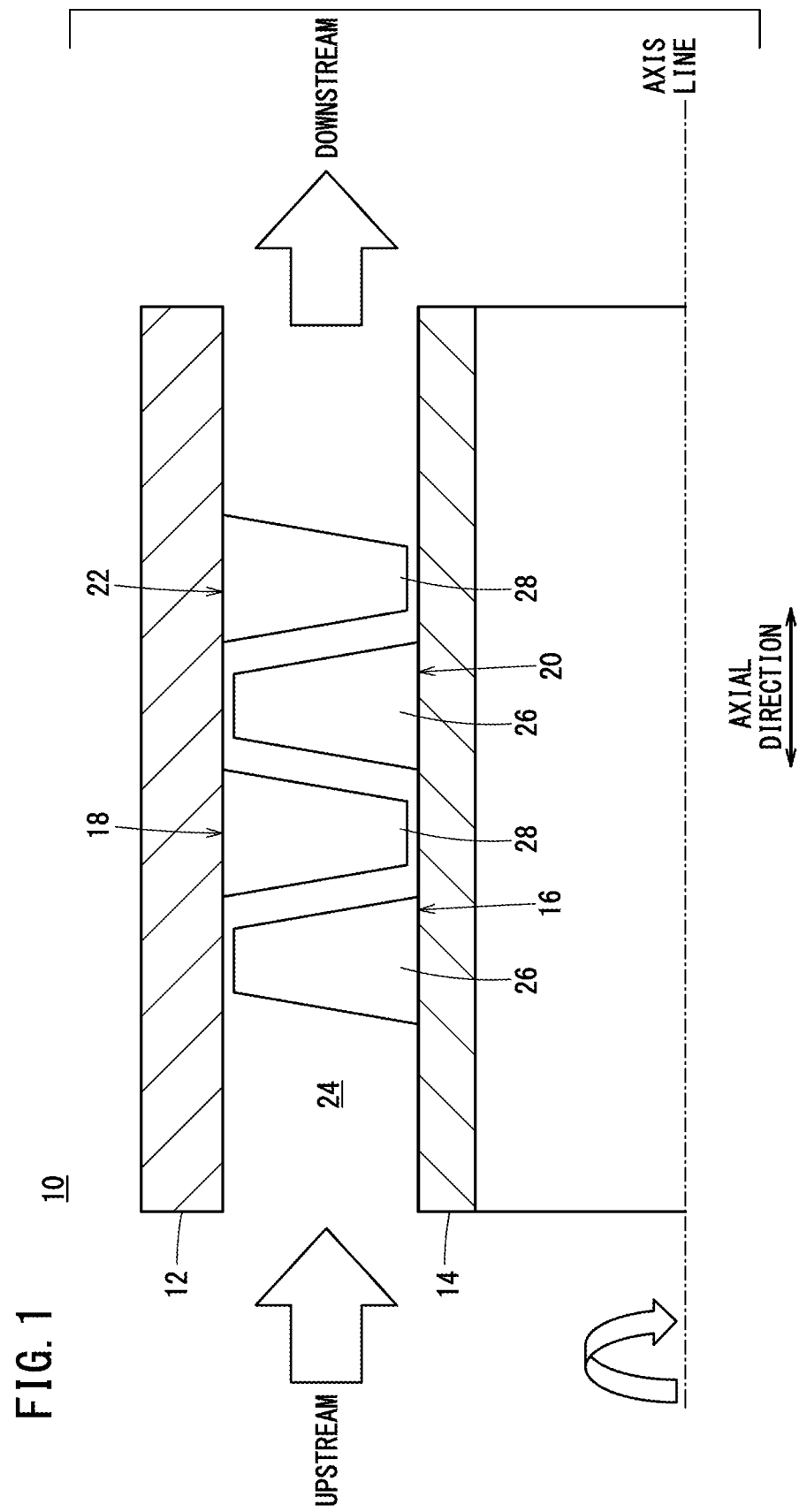
FIG. 1 is a schematic sectional view of a turbomachinery according to a first embodiment.

As shown in FIG. 1, a turbomachinery 10 according to the present embodiment includes a casing 12, a rotor shaft 14, rotary blade rows 16 and 20, and stationary blade rows 18 and 22. The turbomachinery 10 is applied to a gas turbine engine for an aircraft, for example. The turbomachinery 10 is also applied to ships, vehicles, stationary generators, pumps, and the like. Further, the turbomachinery 10 is also applied to industrial machinery such as a gas-liquid separator, a dust collector, a vacuum pump, and the like.

The casing 12 is formed in a substantially cylindrical shape. The rotor shaft 14 is disposed concentrically with the casing 12. The rotor shaft 14 is rotatably supported by a bearing (not shown) with respect to the casing 12. An air compression duct 24 is formed between the outer peripheral portion of the rotor shaft 14 and the inner peripheral portion of the casing 12.

In the air compression duct 24, two rows of front and rear rotary blade rows 16 and 20 and two rows of front and rear stationary blade rows 18 and 22 are arranged. The rotary blade rows 16, 20 and the stationary blade rows 18, 22 are arranged, from the upstream side, in the order of the first rotary blade row 16, the first stationary blade row 18, the second rotary blade row 20, and the second stationary blade row 22. That is, the first stationary blade row 18 is disposed adjacent to the first rotary blade row 16 on the axially rear side of the first rotary blade row 16, and the second rotary blade row 20 is disposed adjacent to the first stationary blade row 18 on the axially rear side of the first stationary blade row 18. Further, the second stationary blade row 22 is disposed adjacent to the second rotary blade row 20 on the axially rear side of the second rotary blade row 20.

The first rotary blade row 16 and the second rotary blade row 20 include a plurality of rotary blades 26 fixed to the rotor shaft 14. These rotary blades 26 are arranged at constant pitches in the circumferential direction of the rotor shaft 14 in the first rotary blade row 16 and the second rotary blade row 20. The first stationary blade row 18 and the second stationary blade row 22 include a plurality of stationary blades 28 fixed to the casing 12. These stationary blades 28 are arranged at constant pitches in the circumferential direction of the casing 12 in each of the stationary blade rows 18 and 22.

In the above-described turbomachinery 10, the rotary blade 26 and the stationary blade 28, which are adjacent to each other in the axial direction, apply periodic aerodynamic force to each other. For example, in the case of the turbomachinery 10 shown in FIG. 1, the first rotary blade row 16 and the first stationary blade row 18 provide aerodynamic force to each other. Further, the first stationary blade row 18 and the second stationary blade row 22 serve as a force-applying side with respect to the second rotary blade row 20.

Figure 2:
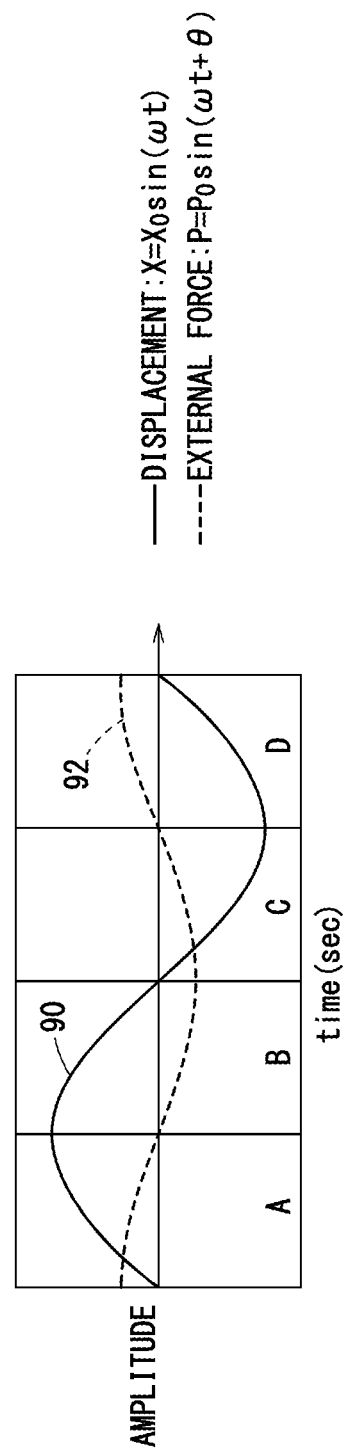
FIG. 2 is a diagram for explaining displacement caused by vibrations of a downstream-side blade row and amplification of vibrations caused by periodic external force generated from an upstream-side blade row.

Because of the periodic force (air flow) applied from the upstream force-applying side blade row and the vibrations of the blades belonging to the force-receiving side blade row, the vibrations of the force-receiving side blades may be amplified, leading to and blade row flutter. In FIG. 2, a curve 90 represents displacement X of a blade that is a force-applying target. The curve 90 shows a temporal change of displacement $X = X_0 \sin(\omega t)$ based on the natural vibration of a force-receiving side blade.

A curve 92 in FIG. 2 shows external force P acting on the blade that is the force-applying target. The external force P changes according to $P = P_0 \sin(\omega t + \theta)$, which is out of phase by $\theta$ with respect to the vibrations of the blade. The work done by the external force P on the blade during one period of vibration ($\omega t = 0$ to $2\pi$) is given by the following equation (Equation 1).

$$W = \int P dx = \int_0^T P \frac{dx}{dt} dt = \frac{1}{\omega} \int_0^{2\pi} P \frac{dx}{dt} d(\omega t) = P_0 x_0 \int_0^{2\pi} \sin(\omega t + \varphi) \cos(\omega t) d(\omega t) \quad (1)$$

As shown in the table in FIG. 2, the external force P (curve 92), the phase $\theta$ of which advances by $\pi/2$ (1/4 cycle) with respect to the vibrations of the blade, acts on the blade in the same direction as the direction of a displacement velocity of the blade. Thus, the external force P represented by curve 92 does positive work on the blade during one period of vibration. The vibrations of the blade is increased by an external force P, the phase of which delays by $\pi/2$. If the input of such external force P continues, vibration displacement of the blade continues to increase, resulting in that the blade is damaged.

Figure 3:
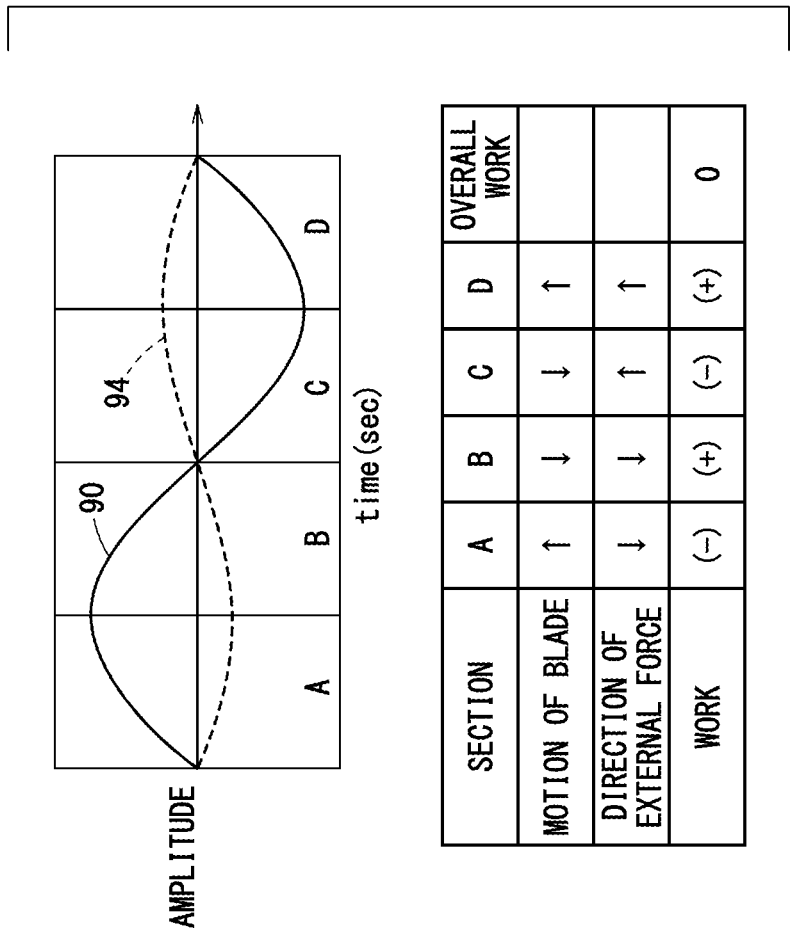
FIG. 3 illustrates an example in which displacement due to vibrations of the downstream-side blade row is not amplified by periodic external force generated from the upstream-side blade row.

On the other hand, a curve 94 in FIG. 3 shows external force P shifted by $\pi$ (1/2 cycle) with respect to a displacement motion of the blade. As shown in the table in FIG. 3, alternately appear a section where the direction of the external force P is the same as the direction of the displacement velocity of the blade and a section where the direction of the external force P is opposite to the direction of the displacement velocity of the blade. Therefore, the external force P indicated by the curve 94 does not do work on the blade over one entire cycle and thus does not contribute to an increase in vibration of the blade. In this case, the external force P does not increase the vibrations of the blade located on the force-receiving side.

In a case of a blade row including a plurality of blades, the entire blade row vibrates in the circumferential direction in a manner that the entire blade row waves. Therefore, attention must be paid to an interblade phase angle (IBPA) from the viewpoint of preventing blade row flutter. Here, the interblade phase angle (IBPA) is obtained from a nodal diameter Nd and the number of blades Zres according to the following equation:

$$IBPA = \frac{360 \times N_d}{Z} [deg] \quad (2)$$

where Nd denotes the nodal diameter, which is the number of nodes of circumferential vibrations of an impeller (blade row). Zres is the number of blades included in the force-receiving side blade row.

Figure 4:
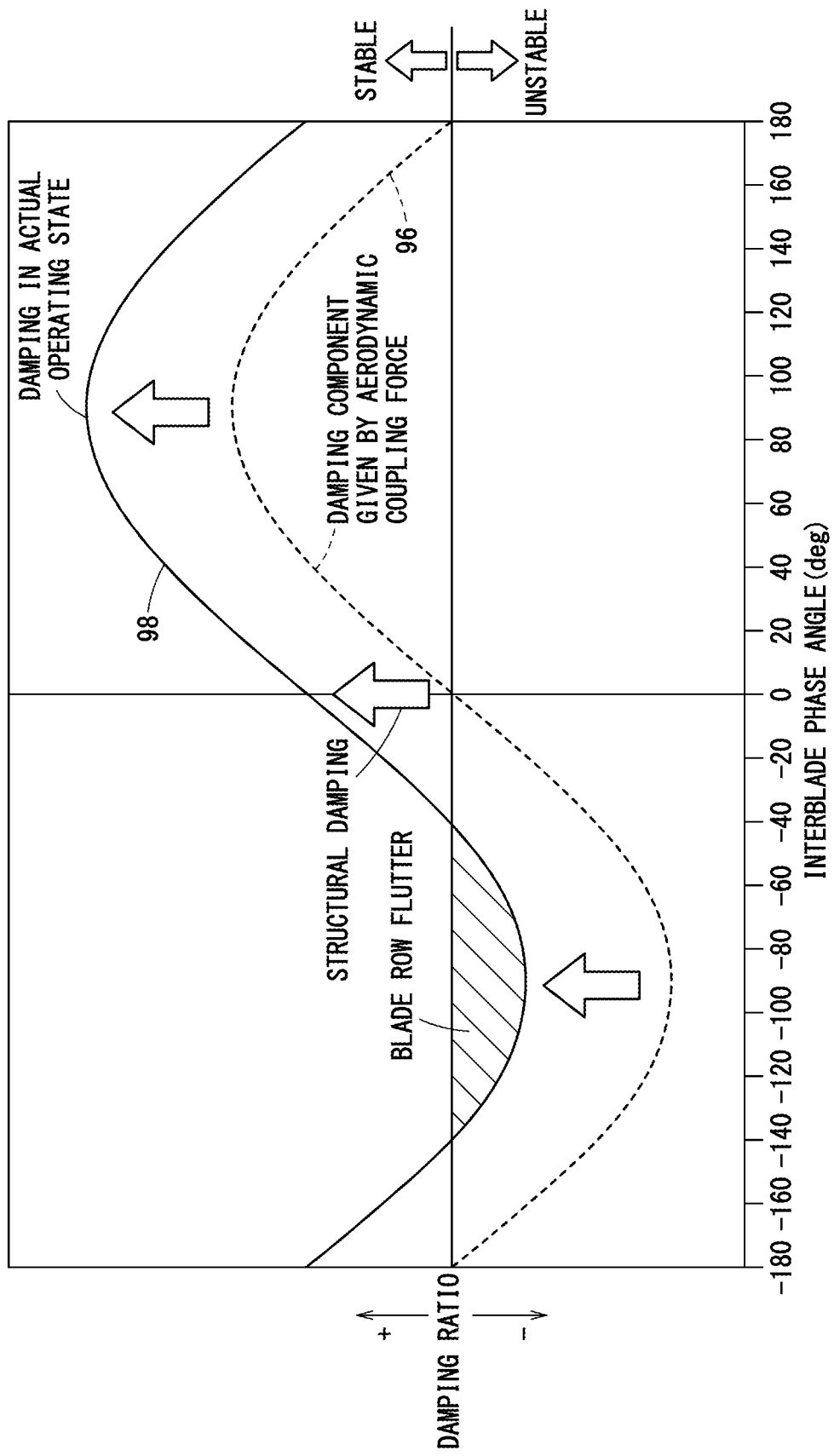
FIG. 4 is a diagram showing the relationship between an interblade phase angle of the blade row on a force-receiving side and a damping ratio.

The relationship between the interblade phase angle (IBPA) and the stability against blade vibrations is shown in FIG. 4. In FIG. 4, a broken line 96 represents a damping component given by the aerodynamic coupling force. The damping component in an actual operating state is given as shown in a solid line 98 because a damping component due to the structure contributes to stabilization. Even in actual operation, when the interblade phase angle is in the range of $-140°$ to $-40°$, the damping ratio is in a negative range. Therefore, there is a possibility that unstable vibration will occur if the machine is used when the interblade phase angle is in the range of $-140°$ to $-40°$.

When the interblade phase angle is $+90°$, the damping ratio of the blade row reaches the maximum and thus the best stability is acquired against the blade row flutter. The interblade phase angle of $\pm 180°$ falls within a stable range against the blade row flutter, although the damping ratio is not maximum. Therefore, the present embodiment adopts a combination of the numbers of blades to make the interblade phase angle $\pm 180°$, thereby preventing the blade row flutter.

The vibrations of the blade row of interest increases when the phase coincides with the force from an adjacent blade row on the upstream or downstream side. From this condition, the following relationship exists between the force-applying harmonics and the number of nodal diameters Nd:

$$H + N_d = n Z_{res} \quad (3)$$

where H is the force-applying harmonics, Nd is the number of node diameters, n is an integer, and Zres is the number of blades in the blade row of interest.

The force-applying harmonics H is, in the case of vibrations caused by interference between the blade rows, the number of blades (and an integer multiple thereof) of the adjacent stationary blade rows 18 and 22 when the blade row of interest is the rotary blade 26. The force-applying harmonics H is equal to the number of blades (and an integer multiple thereof) of the adjacent rotary blade rows 16 and 20 when the blade row of interest is the stationary blade 28. That is, when the number of blades in the blade row adjacent to the blade row of interest is Zex, the force-applying harmonics H becomes H=m·Zex (m is an integer). Therefore, the equation of the resonance condition above can be rewritten as follows:

$$mZ_{ex}+N_d=nZ_{res} \qquad (4)$$

Therefore, the node diameter Nd can be expressed by the following equation using Zres and Zex.

$$N_d=nZ_{res}-mZ_{ex} \qquad (5)$$

By replacing the node diameter Nd in Equation 2 with Zres and Zex of Equation 5, and by setting the interblade phase angle to 180°, which gives stability with respect to the blade row flutter, equations showing the combination of Zres and Zex can be obtained.

$$\varphi = \frac{2\pi(nZ_{res} - mZ_{ex})}{Z_{res}} = \pm\pi \qquad (6)$$

$$2(nZ_{res} - mZ_{ex}) = \pm Z_{res} \qquad (7)$$

$$Z_{res} = \frac{2m}{2n \mp 1}Z_{ex} \qquad (8)$$

The blade row having the number of blades Zres satisfying the above Equation 8 with respect to the number of blades Zex in the adjacent blade row becomes stable with respect to the blade row flutter. In the above Equation 8, a combination of two blade numbers Zres is given for one pair of integers m and n.

As a first example, a case where the number of blades Zex in adjacent blade row is 15 will be described. In this example, when the force application where an integer m is 1 and the force-applying harmonics H is 15 is considered, if an integer n is 1, the number of blades Zres is 30 or 10 according to Equation 8. The node diameter Nd is 15 or −5, respectively. The interblade phase angles are −180° and +180°, respectively.

In the second example, the number of blades Zex is 57. In this example, when the force application where an integer m is 1 and the force-applying harmonics H is 57 is considered, if an integer n is 1, Zres is 114 sheets or 38 sheets. The node diameter Nd is 57 or −19, respectively. The interblade phase angles are +180° and −180°, respectively.

In the third example, the number of blades Zex is 165. In this example, when the force application where m is 1 and the force-applying harmonics H is 165 is considered, if integer n is 2, Zres is 110 sheets or 66 sheets. The node diameter Nd is −55 or −33, respectively. The interblade phase angle is −180° in both cases.

Figure 5:
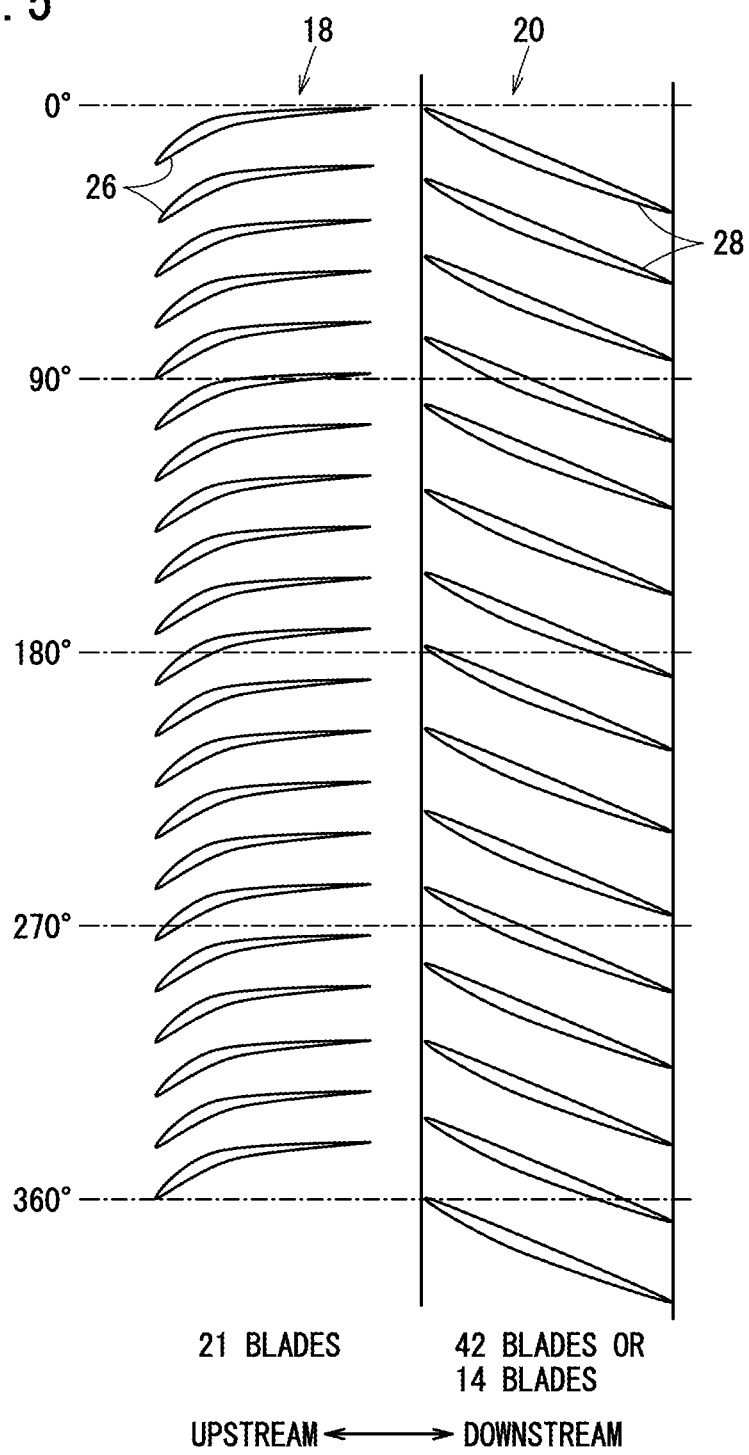
FIG. 5 is an explanatory diagram showing an example of setting the number of blades for the stationary blade row and the rotary blade row of an axial compressor (turbomachine).

FIG. 5 shows an example of application of the turbomachinery 10 to an axial compressor. In this axial compressor, the first stationary blade row 18 is a force-applying side, and the second rotary blade row 20 on the downstream side is a force-receiving side. In the illustrated example, the number of blades Zex in the first stationary blade row 18 is 21. In this case, when the integers m and n are respectively set to 1, the number of blades Zres in the second rotary blade row 20 is 14 or 42 according to Equation 8. The example of FIG. 5 shows a case where the number of blades of the second rotary blade row 20 is 14. Such a combination of the number of blades can prevent the blade row flutter of the second rotary blade row 20. The number of blades of the first stationary blade row 18 and the second stationary blade row 22 can also be determined in the same manner as described above. With respect to the first stationary blade row 18, the first rotary blade row 16 serves as a force-applying blade row. Therefore, the number of blades in the first stationary blade row 18 can be determined by obtaining the value of Zres by Equation 8 where Zex is the number of blades of the first rotary blade row 16. On the other hand, the number of blades in the second rotary blade row 20 can be obtained as Zex when the number of blades in the second stationary blade row 22 is Zres.

Figure 6:
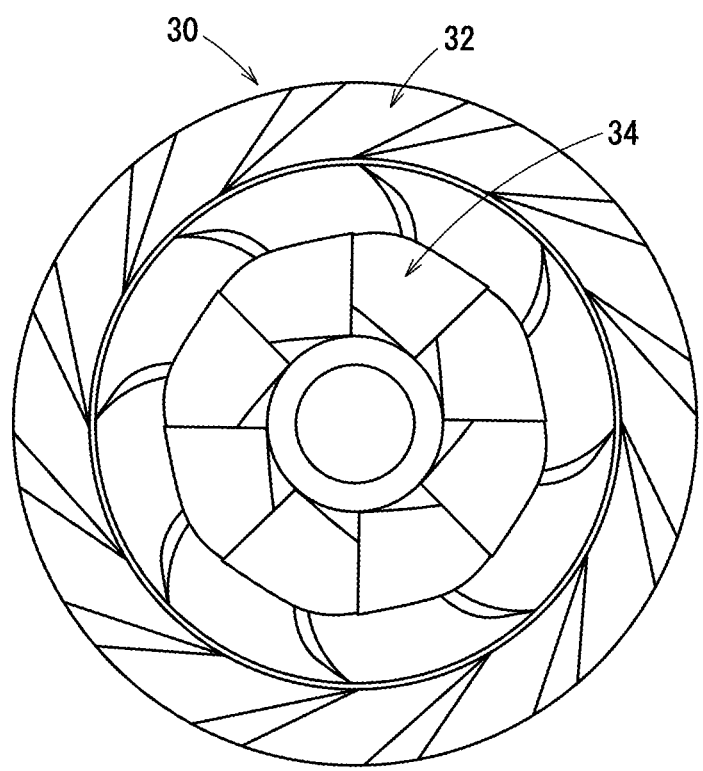
FIG. 6 is an explanatory diagram showing an example of a combination of diffuser vanes and rotor vanes of a centrifugal compressor (turbomachine).

FIG. 6 shows an example of application to a diffuser vane 32 and a rotor vane 34 of a centrifugal compressor 30 (turbomachine). In the illustrated example, the diffuser vane 32 acts as the force-applying side, and the number of blades Zex is, for example, 12. The number of blades Zres of the rotor vane 34 acting as the force-receiving side is determined to be 24 or 8, respectively, when the integers m and n are 1 (see Equation 8). The centrifugal compressors 30 can prevent the blade row flutter of the rotor vanes 34.

The present embodiments are summarized as follows.

A turbomachinery (10) provided with a casing (12), a rotor shaft (14) rotatably attached to the casing, a first blade row including a plurality of first blades fixed to either one of the rotor shaft or the casing and attached at constant pitches in the circumferential direction of the central axis line, and a second blade row including a plurality of second blades fixed to either one of the rotor shaft or the casing and arranged adjacent to the first blade row on the upstream side or downstream side of the first blade row and attached at constant pitches in the circumferential direction of the central axis line, wherein the turbomachinery sets the number of first blades and the number of second blades in a manner so that the interblade phase angle between blades of the second blade row is ±180°.

In the above-described turbomachine, since the number of blades is determined in a manner that the second blade row does not easily vibrate in response to the force application by the first blade row, the blade row flutter of the second blade row can be prevented. Further, since the first blades and the second blades are arranged at constant pitches in the circumferential direction, blade row flutter can be prevented without sacrificing the aerodynamic performance of the turbomachine.

The turbomachinery described above satisfies an equation of Zres=Zex·2m/(2n±1) where m and n are integers and Zex denotes the number of first blades and Zres denotes the number of second blades. This turbomachinery can prevent the blade row flutter because the interblade phase angle of the blade row on the force-receiving side can be set to 180°, which is stable against vibrations.

The first blade row may be a first stationary blade row 18 fixed to the casing while the second blade row may be a second rotary blade row 20 rotating together with the rotor shaft. Since the rotary blade 26 does not cause the blade row flutter, the rotary blades 26 can be made thinner and lighter.

The present embodiment describes a method of designing a turbo device including a casing, a rotor shaft rotatably attached to the casing, a first blade row including a plurality of first blades fixed to either one of the rotor shaft or the casing and attached at constant pitches in the circumferential direction of the central axis line, and a second blade row including a plurality of second blades fixed to either one of the rotor shaft or the casing, arranged adjacent to the first blade row on the upstream side or downstream side of first blade row, and attached at constant pitches in the circumferential direction of the central axis line, the method including setting the number of first blades and the number of second blades in a manner so that the interblade phase angle of the second blade row is ±180°.

The above-described method of designing the turbomachinery can prevent the blade row flutter without sacrificing the aerodynamic performance of the turbomachine.

In the above design method of a turbo apparatus, the number of first blades and the number of second blades are set so as to satisfy Zres=Zex·2m/(2n±1) where m and n are integers and Zex is the number of first blades and Zres is the number of second blades. In the method of designing the turbomachine, the interblade phase angle of the blade row on the force-receiving side (downstream side) can be set to 180°, which is stable against vibrations, whereby the blade row flutter can be prevented.

The first blade row may be a stationary blade row fixed to the casing, and the second blade row may be a rotary blade row rotating together with the rotor shaft. In the method of designing the turbomachine, the blade row flutter of the rotary blade row can be prevented and thus the rotary blades can be made thinner and lighter.

It should be noted that the present invention is not limited to the above-described embodiment, and various configurations can be adopted without departing from the gist of the present invention.

The invention claimed is:

1. A turbomachinery comprising:
a casing;
a rotor shaft that is rotatably attached to the casing;
a first blade row that includes a plurality of first blades fixed to either one of the rotor shaft or the casing and attached at constant pitches in a circumferential direction of a central axis line; and
a second blade row that includes a plurality of second blades fixed to another of the rotor shaft or the casing, arranged adjacent to the first blade row on an upstream side or downstream side of the first blade row, and attached at constant pitches in the circumferential direction of the central axis line,
wherein
the turbomachinery sets the number of first blades and the number of second blades in a manner so that an interblade phase angle of the second blade row is ±180°.

2. The turbomachinery according to claim 1, wherein
when the number of first blades is Zex and the number of second blades is Zres, the number of first blades and the number of second blades are set to satisfy an equation of $$Z_{res} = \frac{2m}{(2n \pm 1)} Z_{ex}$$

where m and n are integers.

3. The turbomachinery according to claim 2, wherein
the first blade row is a stationary blade row fixed to the casing, and the second blade row is a rotary blade row rotating together with the rotor shaft.

4. A method of designing a turbomachinery comprising a casing, a rotor shaft that is rotatably attached to the casing, a first blade row that includes a plurality of first blades fixed to either one of the rotor shaft or the casing and attached at constant pitches in a circumferential direction of a central axis line, and a second blade row that includes a plurality of second blades fixed to another of the rotor shaft or the casing, arranged adjacent to the first blade row on an upstream side or downstream side of the first blade row, and attached at constant pitches in the circumferential direction of the central axis line,
wherein the method comprises
setting the number of first blades and the number of second blades in a manner that an interblade phase angle of the second blade row is ±180°.

5. The method of designing the turbomachinery according to claim 4, wherein
when the number of first blades is Zex and the number of second blades is Zres, the number of first blades and the number of second blades are set to satisfy an equation of $$Z_{res} = \frac{2m}{(2n \pm 1)} Z_{ex}$$

where m and n are integers.

6. The method of designing the turbomachinery according to claim 5, wherein
the first blade row is a stationary blade row fixed to the casing, and the second blade row is a rotary blade row rotating together with the rotor shaft.

* * * * *